UNITED STATES PATENT OFFICE.

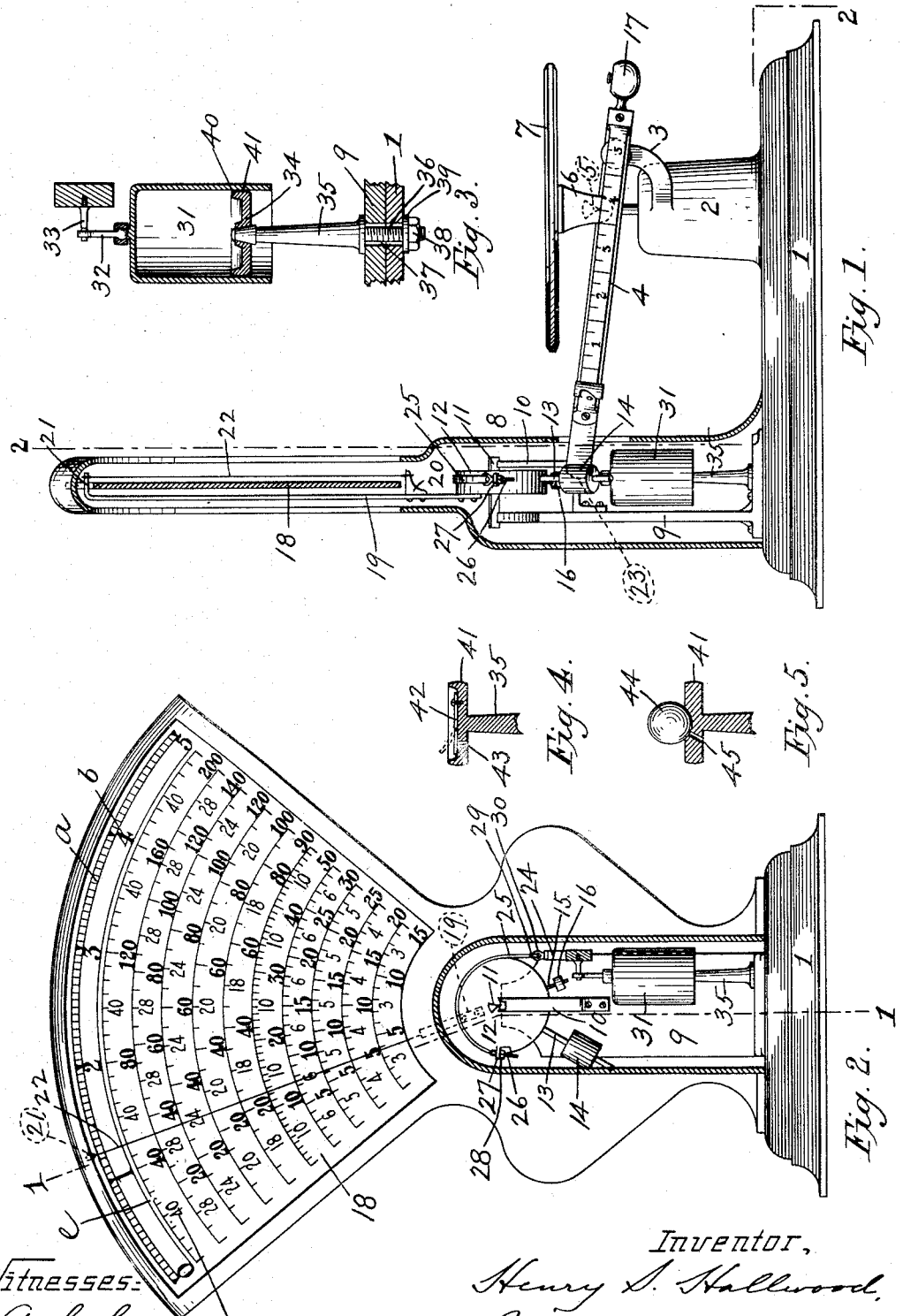

HENRY S. HALLWOOD, OF COLUMBUS, OHIO.

PENDULUM COMPUTING-SCALE.

1,041,997.   Specification of Letters Patent.   Patented Oct. 22, 1912.

Application filed October 20, 1905. Serial No. 283,619.

*To all whom it may concern:*

Be it known that I, HENRY S. HALLWOOD, residing at Columbus, in the county of Franklin and State of Ohio, have invented a certain new and useful Improvement in Pendulum Computing-Scales, of which the following is a full, clear, and exact description, reference being had to the accompanying drawings.

My invention relates to pendulum computing scales and has for its objects to reduce to a minimum the vibration of the scale and the associated movable indicating parts when an article to be weighed is placed on the pan or is removed therefrom after weighing, and to provide such scales with an improved form of chart or table.

It is attempted to overcome the vibration referred to by the employment of an oil well dash pot connected with one of the movable parts, but such dash pots cause inaccurate and unreliable results, owing to the fact that the viscosity of the oil therein varies with the quality of oil employed as well as with the changes of temperature, which makes it necessary to provide and operate oil valves to regulate the friction according to the weather. Each change of the temperature brings a changed condition of viscosity. When the oil increases in temperature the vibrations increase excessively. When the temperature decreases the oil congeals and destroys the accuracy and sensitiveness of the scale. Under such conditions both underweight and overweight are possible.

I have devised a computing scale of the pendulum type that will be free from the above defects and uniformly accurate under all conditions of temperature and weather, by the employment of an air cylinder or dash pot of simple and effective construction, which will not require any attention or adjustment. I have also devised a simple and novel construction of indicating means, whereby the weight, price per pound, and values of commodities at different prices per pound may be accurately and conveniently ascertained.

Generally speaking, my invention may be defined as consisting of the combinations of elements illustrated in the drawings and embodied in the claims hereto annexed.

Referring to the drawings:—Figure 1 represents a view, approximately on line 1—1 of Fig. 2, of a scale constructed in accordance with my invention, the pendulum and drum being shown in elevation; Fig. 2 represents a sectional view taken on the line 2—2 of Fig. 1, the support for the weighing lever being removed for clearness of illustration; Fig. 3 represents a vertical section through the dash pot, showing the manner in which it is supported by its platform; and Figs. 4 and 5 are sectional details showing modifications of the piston head shown in Fig. 3.

Describing the parts by reference numerals, 1 represents the base or the platform of the scale. The base supports at one end the pillar 2 which carries brackets 3 to which are pivoted the branches of the scale beam 4, the upper edges of said branches being provided with the usual agate bearings for receiving the knife blade pivot 5 carried by brackets 6 which depend from the scale pan 7. At the opposite end of the platform is supported the casing 8 within which the chart, drum, movable index, and dash pot are located. Supported by the platform within the casing is the standard 9 having secured thereto the bracket 10. The upper ends of said standard and bracket are provided with the ordinary agate bearings for the knife edge pivot 11 of the drum 12 which carries the index. Projecting from said drum is the pendulum rod 13, having thereon the adjustable weight 14. Projecting from the drum is the arm 15, having a weight 16 threaded thereon, by the adjustment of which said drum may be adjusted to set to zero the indicating means carried thereby when no weight is on the scale pan. This result is facilitated by placing shot or similar finely divided material in the receptacle 17 supported by the ends of the scale beam branches. By the use of shot or similar finely divided material in the receptacle 17, the indicating means may be set to an approximate zero position, after which the weight 16 may be screwed along the rod 15 to complete the adjustment. After the adjustment has been made, the weight 16 is sealed in position.

The casing is substantially open, front and back, and has secured within the same, in any suitable manner, a chart or table 18. This chart is provided near the upper periphery thereof with a series of graduations *a* indicating ounces, and a corresponding series of numerals *b* indicating pounds. In the drawing, I have shown a five-pound chart, for clearness of illustration, although it will be apparent that a chart having a larger capacity may be employed. This chart is provided with concentric series of graduations, the graduations of each series indicating the values of different commodities at different prices per pound (or other unit of weight). At convenient intervals, each series of graduations is provided with numerals c indicating the price per pound (or other unit of weight) of the particular commodity weighed. For instance, the outer series e of graduations corresponds to forty cents per pound. The arc corresponding to this rate is divided into a convenient number of graduations, said graduations representing a convenient fractional part of the price per pound. For clearness of illustration, I have shown the five-pound arc as divided into forty equal parts, each division representing a value of five cents. Of course, on a large chart, the arc will be divided into a larger number of graduations, making it possible to indicate by each graduation a difference of one cent in the value of the commodity weighed. With these graduations, I prefer to place the figures representing the values at such places as will enable me to use multiples of 10, for convenience of reading. For instance, with the series e, I may employ the numerals 40, 80, 120, 160 and 200, although on a chart where more room is provided, I may employ the numerals 10, 20, 30, 40, etc. To avoid crowding, however, I have shown only the numerals 40, 80, etc., as indicating the values of commodities at forty cents per pound. At convenient intermediate points, preferably slightly above the value-indicating numerals 40, 80, etc., I place numerals indicating the price per pound of the commodity. The two sets of numerals indicating respectively the price per pound and values of commodities at such price per pound will be further distinguished from each other, as by making them of different color, or by making one set of numerals heavy and the other of light or skeleton outline. In the drawing, the numerals indicating values are shown as heavy while those indicating the price per pound are light or skeleton. In the same manner, each other series of graduations is provided with suitable numerals indicating the price per pound and the values of commodities at such price per pound. For instance, the next concentric series of graduations is worked out on a basis of twenty-eight cents per pound and the graduation thereon will represent some fraction of 10. The numerals indicating values are shown as placed at 20, 40, 60, 80, 120 and 140, although, on a large chart, numerals will be placed intermediate of the numerals above mentioned, beginning at 10 and increasing progressively by multiples thereof. The numerals representing the price per pound (28) are indicated in the same manner as those representing the price per pound in the preceding series. As many of such series of graduations, with appropriate numerals representing prices per pound and values, will be provided as may be deemed necessary, the same principle being followed as to dividing the arc and to applying numerals thereto as has been set forth in connection with the first two series of graduations.

In order to facilitate the reading of the weight, price per pound, and value of any commodity, I employ with such chart a novel form of indicator comprising an arm 19 suitably secured to the rear face of the drum 12 and extending above the top of the chart, as indicated more particularly in Fig. 1. Below the chart, the arm is provided with a bracket 20 between which and the overhanging end 21 of such arm is stretched a wire 22 of any suitable material. The length of the arm 13 and the mass of the weight 14 thereon are such as to cause the wire 22, when the parts are adjusted as hereinbefore set forth, to indicate correctly, by the intersection of such wire with the chart, the weight and value of the particular commodity which may be placed on the pan 7. If desired, the arm 19 may be provided with figures indicating the prices per pound of the articles being weighed, said figures corresponding to the figures d on the chart.

The platform and the scale beam, and the manner of supporting the latter are substantially identical with the construction shown in my application No. 244,910, filed Sept. 9, 1905. As is the case in said application, the end of the scale beam 4 projects through the casing 8. The inner end of said beam is rounded, as shown in dotted lines at 23, the curvature being preferably that produced by an arc drawn from the pivot of the scale beam as a center. As a means for connecting said drum and the scale beam I employ flexible means, as metallic bands or ribbons 24, 25, the former being secured to the arc-shaped end of the scale beam, the latter to the drum. As disclosed in my said application, the end of the band or ribbon 25 may be adjustably secured to the drum, by means of a bolt 26 extending through a lug 27 on the drum, there being an adjusting nut 28 on said bolt. As the planes of movement of said beam and drum are at right angles to each other, said bands are connected by means of the links 29 and 30.

To permit quick and accurate reading of the scale, it is important that means should be provided for reducing to a minimum the vibration due to the inertia of the drum and its indicating members. For this purpose, I connect the drum, through the scale beam, with a pneumatic dash pot. This dash pot comprises a cylinder 31 connected to a link 32 by a universal joint, which is pivotally supported from an arm 33 projecting laterally from the end portion of the scale beam. This cylinder reciprocates on a piston head 34 carried by the rod 35, said rod being conveniently supported by the base of the standard 9. As will appear more particularly from Fig. 3, the rod 35 is adjustably supported from said base by means of a reduced threaded portion 36 extending through an enlarged opening 37 which extends through the base of the standard 9 and the top of the platform 1, said threaded portion being provided with a nut 38 and washer 39. The relative sizes of the reduced portion 36 and opening 37 are such as to permit of the adjustment necessary to maintain a proper relation between the cylinder and the piston head.

The diameter of the piston head is sufficiently smaller than the intermediate diameter of the cylinder to permit the air to pass slowly between these parts, thereby reducing to a minimum the vibrations of the beam and the connected drum and indicator when an article is placed on or removed from the pan 7. The upper surface of the piston head is preferably dished or concaved, as is shown in Figs. 3 and 5, and the rim 40 adjacent the periphery of the piston head is inclined upwardly toward the wall of the cylinder. As the cylinder descends, it produces an eddying of the air within the cylinder above the piston head, thereby retarding the flow of air between the piston head and the cylinder wall and a corresponding increase in efficiency of the dash pot. As will appear more particularly, from Figs. 3, 4 and 5, the side edge 41 of the piston head is rounded to permit of the tilting of the cylinder without obstructing the flow of air between the same and the piston head or without causing parts to bind by reason of such tilting. The curvature of said edge preferably corresponds to that of an arc described from the pivot of the scale beam as a center, but is exaggerated in the drawing for clearness of illustration.

In Fig. 4, I have shown the piston head as provided with a valve. In the former figure, the valve is a flap valve 42 of suitable material, as rubber, secured to the upper surface of the piston head and covering the opening 43 therethrough. In the latter figure the valve is a ball valve 44, preferably of rubber, covering the inclined opening 45 extending through the piston head. This arrangement permits air to enter the cylinder freely when the article weighed is removed from the pan and permits the wieghing beam and indicator to return quickly to the normal or zero position. When the article is placed on the scale beam to be weighed, the compression of the air within the cylinder above the piston head and the weight of the valve close said valve, compelling the escaping air to pass slowly between the piston head and the cylinder, and thus reducing to a minimum the vibration of the scale beam and indicator.

As hereinbefore explained, the employment of oil dash pots for use with scale beams is objectionable because such dash pots are unreliable to give uniform results, as a change in the grade of oil employed, the evaporation of the more volatile constituents of the oil and changes of temperature will affect the viscosity of the oil, rendering its rate of flow uncertain and making it necessary to devote constant attention to the manipulation of the oil valves to regulate the friction according to such variations in the condition of the oil.

The employment of a pneumatic dash pot such as herein described and illustrated not only obviates the above objectionable features, but permits the employment of a simple and economical construction for overcoming such objections.

It is desirable to space the graduations of the chart uniformly, but as the movement of the pendulum, due to varying weights placed on the scale pan, is not exactly proportional to the arc of the circle described by the end of the pendulum, it is necessary to make the drum eccentric or cam-shaped in outline, as shown particularly in Fig. 2.

It will be apparent that numerous modifications and changes may be made in the embodiment of my invention herein disclosed without departing from the spirit thereof, and I do not presume to be limited to details of construction shown in this embodiment except as such details may be positively included in the claims hereto annexed or may be rendered necessary by the prior state of the art.

Having thus described my invention what I claim as new and desire to secure by Letters-Patent is:—

1. The combination, with a scale beam, of a drum operated thereby, a chart, a bracket or arm connected with said drum and extending along one face of said chart, and a wire supported at both ends by said bracket or arm and extending along the other face of said chart, substantially as specified.

2. The combination, with a scale beam, of a graduated chart, a drum operated by said scale beam, an arm carried by said drum and extending along one face of said chart and having its upper end overhanging the chart and projecting across the plane of the same, a bracket carried by said arm below said chart and projecting across the plane of the same, and a wire extending between said bracket and overhanging end of the arm, substantially as specified.

3. The combination, with a scale beam, of a rotary drum connected thereto, a chart extending transversely of the axis of said drum, an arm carried by said drum and extending adjacent one face of said chart, said arm having projections extending across the plane of the chart, and a wire extending between such projections adjacent the face of the chart opposite said arm, substantially as specified.

4. The combination, with a scale beam having a curved outer end, a rotary drum having a cam-shaped surface, a pendulum carried by said drum, a flexible connection between such curved end of the scale beam and the cam-shaped surface of said drum, a chart extending transversely of the axis of said drum, an arm carried by said drum and having projections extending across the plane of the chart, and a wire extending between such projections, substantially as specified.

5. In a scale of the character described, the combination of a scale beam, a rotary drum, means flexibly connecting said drum and said scale beam, an arm carried by said drum and having projections therefrom, a chart extending transversely of said drum and located between said projections, and a wire extending between said projections on the side of the chart opposite said arm, substantially as specified.

6. The combination, with a scale beam, of a graduated indicating member or chart, a second indicating member comprising an arm extending above one side of said chart and a wire secured at both ends to said arm and extending along the other side of said chart, and means for operating one of said indicating members by the movement of said scale beam, substantially as specified.

7. The combination, with a scale beam, of a graduated indicating member, a second indicating member comprising a wire supported at both ends and extending in proximity to a face of said first-mentioned indicating member, a rotary drum carrying one of said indicating members, and means connecting said scale beam and drum, substantially as specified.

8. The combination, with a scale beam, of a rotary drum connected thereto, an indicating member or chart, a second indicating member comprising an arm extending across one face of said chart and having projections extending across the plane of said chart and a wire stretched between said projections and in proximity to the other face of said chart, one of said indicating members being carried by said drum, substantially as specified.

9. In a scale, the combination of an oscillating scale beam, a pneumatic dash pot coöperating with said beam to reduce the vibrations thereof to a minimum, said dash pot comprising a cylinder flexibly connected to said scale beam and with a piston head, the side edge of the piston head being rounded, substantially as specified.

10. In a scale, the combination of an oscillating scale beam, a pnuematic dash pot coöperating with said beam to reduce the vibrations thereof to a minimum, said dash pot comprising a cylinder and a piston head, the cylinder being attached to the beam and the piston being adjustably secured to a fixed portion of the scale, substantially as specified.

11. In a scale, the combination of an oscillating scale beam, a pneumatic dash pot coöperating therewith to reduce the vibrations thereof to a minimum, said dash pot comprising a cylinder flexibly suspended from said beam and a piston head having a stem provided with a reduced threaded end extending through a part of the scale, and a washer and nut for such end of said stem, substantially as specified.

In testimony whereof I affix my signature in the presence of two witnesses.

HENRY S. HALLWOOD.

Witnesses:
A. L. PHELPS,
M. B. SCHLEY.